United States Patent
Wang et al.

(10) Patent No.: US 7,961,726 B2
(45) Date of Patent: Jun. 14, 2011

(54) FRAMEWORK FOR OPTIMIZING AND SIMPLIFYING NETWORK COMMUNICATION IN CLOSE PROXIMITY NETWORKS

(75) Inventors: Zhou Wang, Aachen (DE); Alain Gefflaut, Herzogengrath (DE); Alexandre de Baynast, Aachen (DE); Arsalan Ahmad, Aachen (DE); Andreas Steinmetzler, Aachen (DE)

(73) Assignee: Microsoft Corporation, Redmond, WA (US)

( * ) Notice: Subject to any disclaimer, the term of this patent is extended or adjusted under 35 U.S.C. 154(b) by 33 days.

(21) Appl. No.: 12/246,683

(22) Filed: Oct. 7, 2008

(65) Prior Publication Data
US 2010/0085975 A1 Apr. 8, 2010

(51) Int. Cl.
*H04L 12/28* (2006.01)
(52) U.S. Cl. .................................. 370/389; 370/395.54
(58) Field of Classification Search .................. None
See application file for complete search history.

(56) References Cited

U.S. PATENT DOCUMENTS

| 6,397,867 | B2 * | 6/2002 | You .............................. 135/33.7 |
| 7,472,157 | B2 * | 12/2008 | Tolson et al. ................. 709/202 |
| 2005/0037751 | A1 * | 2/2005 | Kim et al. .................. 455/432.1 |
| 2005/0078685 | A1 * | 4/2005 | MacLean et al. ........ 370/395.54 |
| 2007/0195765 | A1 * | 8/2007 | Heissenbuttel et al. ....... 370/389 |

* cited by examiner

*Primary Examiner* — Robert W Wilson
(74) *Attorney, Agent, or Firm* — Turk IP Law, LLC (57) ABSTRACT

A framework capable of providing transparent handling of network traffic in close proximity networks such as home networks is provided. A single virtual network interface is exposed to users/applications on connected devices. A virtual network interface manager determines available physical network interfaces and switches to a different physical network interface or a different configuration on the same physical network interface in a transparent manner to the communicating application(s). This enables the framework to optimize network communications for the communicating applications, devices, and users based on predefined criteria, application requirements such as different data throughput, or changing environment conditions such as interference. Network communication operations are also simplified for users since they are no longer required to have the necessary knowledge for configuring physical network interfaces manually in response to changing conditions.

18 Claims, 7 Drawing Sheets

FRAMEWORK FOR OPTIMIZING AND SIMPLIFYING NETWORK COMMUNICATION IN CLOSE PROXIMITY NETWORKS

BACKGROUND

Networks are commonly perceived as a group of computers communicating via wired and/or wireless means using a shared communication protocol. With the advancement in communication technologies, not only has the variety of devices connected to a network proliferated (e.g., smart phones, smart appliances, entertainment devices, televisions, monitoring systems, and comparable devices), but the types of network communications have also flourished. Today, there are numerous physical network communication media and associated interfaces such as Ethernet, 802.1a/b/g/n, 802.16, UWB, Bluetooth®, and many more will come in the future. Many computing devices, including those listed above, have a multitude of network interfaces to provide communications for different purposes (e.g., short range, long range, high throughput, secure, and similar modes).

Commonly, only a single communication interface is used at any time and each of these communication interfaces is visible to the end user and has to be configured individually. For some of these communication interfaces, several configurations and modes may be available. Once a computing device is configured for a particular network, the use of the network interfaces tends to be static, i.e. the same mode and network interface is used for various applications executed on the computing device regardless of other factors such as communication quality, throughput need, efficiency, and the like.

Moreover, most systems require some form of user intervention when network interfaces are to be set up or modified, which is not an easy task for a common user. Optimization of communications is a difficult process even for expert users as the environmental conditions may change rapidly and not all parameters are necessarily exposed to users. Moreover, a typical user (e.g., a home network user) may not possess a deep understanding of the complex processes involved in communications between different computing devices and applications on those.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a framework capable of providing transparent handling of network traffic in close proximity networks such as home networks by exposing a single network interface visible to the users. For applications executed on connected devices, the framework may enable use of one or more of the available physical network interfaces (and communication media) based on decisions made centrally or in a distributed manner through negotiation between connected devices. The decisions may be made dynamically based on a number of predefined parameters in a transparent manner to the communicating application(s).

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a framework capable of providing transparent handling of network traffic in a close proximity network may be used to enable the use of one or more of available physical network interfaces (and communication media) based on decisions made centrally or in a distributed manner through negotiation between connected devices in a transparent manner to the communicating applications over the network. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with hardware or an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process (es). The computer-readable storage medium can for example be implemented via one or more of a volatile computer memory, a non-volatile memory, a hard drive, a flash drive, a floppy disk, or a compact disk, and comparable media.

Throughout this specification, the term "close proximity network" refers to a communication network where communicating devices are in a configuration that enables centralized (using an infrastructure network) as well as point-to-point communication. Many networks, small or large, utilize one or more nodes to direct network traffic. Especially in larger or sparser networks, such nodes are required and point-to-point communication directly between connected devices may not be feasible or practical due to constraints on transmission power. Embodiments are directed to systems that utilize networks, where point-to-point direct communication is possible at least in a portion of the network. Examples of such networks include, but are not limited to, home networks, small enterprise networks, small public networks, and comparable ones. A "framework" as used herein may be a combination of software and hardware components for managing physical network interfaces in various computing devices in a transparent manner to applications executed on those devices.

Figure 1:
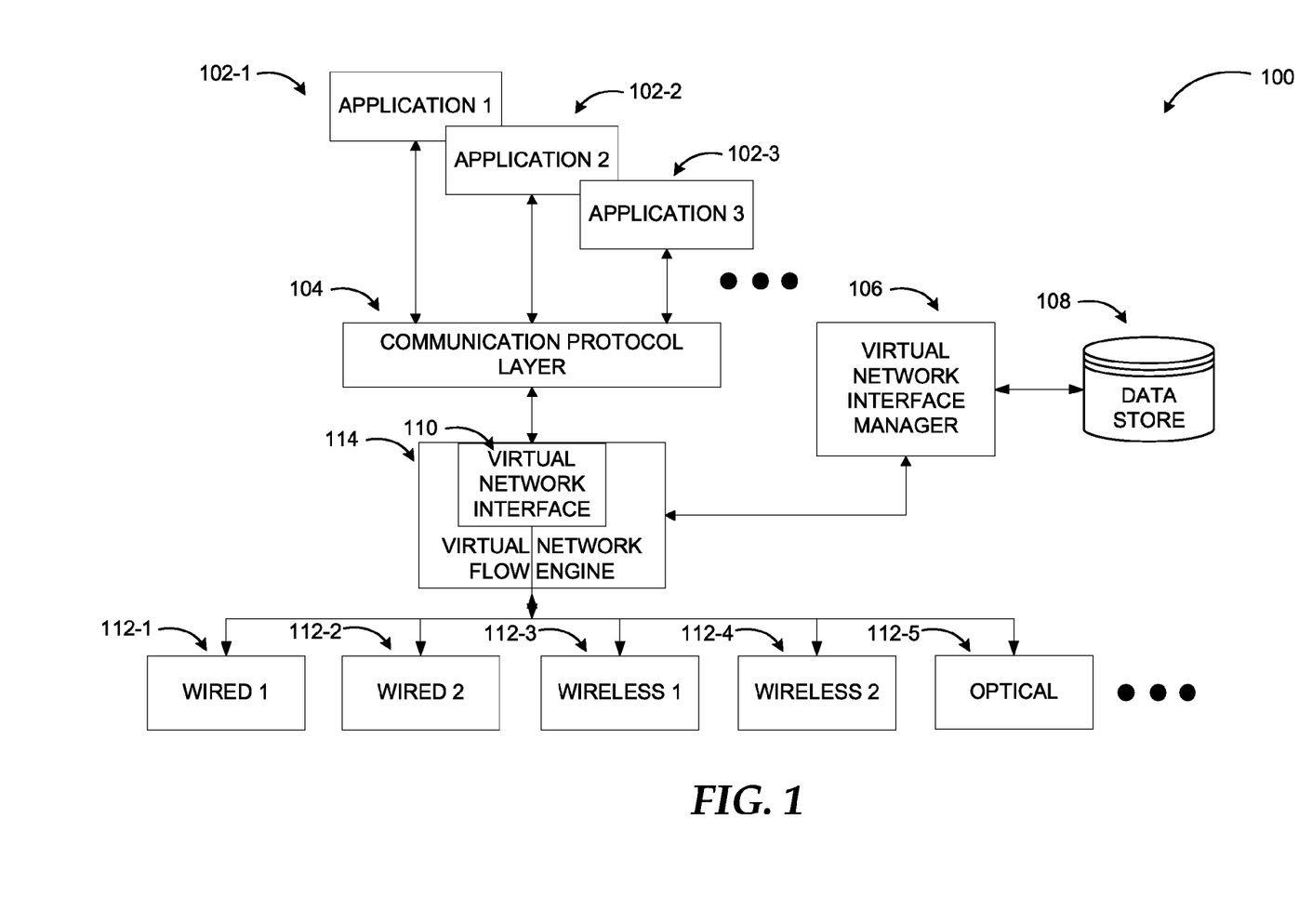
FIG. 1 is a diagram illustrating an architecture of top level components in a computing device implementing network communication optimization according to one embodiment.

Referring to FIG. 1, diagram 100 illustrates an architecture of top level components in a computing device implementing network communication optimization according one embodiment. In a close proximity network the choice of the currently used mode and configuration is dictated by the infrastructure of the network. Once a device has joined the network, communications traffic sent to other devices in the network uses the dictated infrastructure unless another configuration is conducted by users manually. This type of setup presents several challenges for networking such as wireless home networking. Firstly, it requires regular users to manage different network interfaces by themselves, if they do not want to use the default infrastructure network. The users may need to configure the interfaces correctly and arrange applications to use one of the available interfaces on particular devices appropriately. More importantly, such a system prevents any optimization based on the dynamic and automatic configuration of the network interface (e.g. a wireless transceiver using a different frequency) or based on the usage of different interfaces when alternate point-to-point connections between two devices are possible. When such optimizations are possible, the automatic and optimal choice of the network parameters becomes a complex task for a number of reasons. For example, due to rapid change of wireless transmission conditions, the adaptation may have to be performed frequently and may be impractical to perform manually. The optimization of the network parameters typically involves understanding of complex processes happening at different levels of the communication stack, which makes it difficult for any user to apply optimizations.

Furthermore, most existing network configuration solutions require breaking an existing network connection before an alternative one can be established making it impractical, if not impossible, for a user to optimize network communications while one or more applications are actively communicating.

Embodiments enable devices in a close proximity network, such as a home network to transparently choose an appropriate communication mechanism instead of only going through the default infrastructure of the deployed network. This feature enables automatic optimization to be applied on the communication link without interfering with other transmissions inside the network. A proposed framework according to embodiments is capable of providing a complete transparent handling of the network traffic by exposing a single network interface visible to the users. For applications running on the connected devices, data traffic sent to other devices seems to be using the available infrastructure network, while in practice, the traffic is handled by the framework and dispatched either over the infrastructure network—if no other point-to-point connection is available—or over a dedicated link that has been dynamically configured.

The framework according to embodiments also enables parameters used for a communication session to be dynamically negotiated between the connected devices and changed (i.e. transparent horizontal handover), or to have a communication session move from one network interface to another without disturbing the application(s) running on the device (i.e. transparent vertical handover). According to other embodiments, the decision to modify the parameters (and links) may be made in a completely distributed manner, as well as partially or completely by a centralized resource such as a configuration application and dictated to the communicating devices.

A computing device connected to a network may have a plurality of physical network interfaces such as network interfaces 112-1 through 112-5 shown in diagram 100. A framework according to embodiments abstracts the set of physical interfaces available on device and provides to users a single virtual network interface 110 representing the infrastructure network. The available physical network interfaces may be hidden from the users and applications (e.g. 102-1 through 102-3) for simplicity purposes. On the other hand, some form of control to override the automated optimization process may be provided to the users (or certain applications) to accommodate specific preferences. The physical interfaces are configured and managed by a control component of the framework designated as virtual network interface manager 106 in diagram 100, and the data traffic transparently forwarded from the virtual network interface 110 to any of the physical network interfaces 112-1 through 112-5 available on the computing device. The virtual network interface may reside between the communication layer 104 and physical network interfaces 112-1 through 112-5 configuring the latter based on a configuration of the communication layer 104 and preferences of individual applications 102-1 through 102-3.

The decision to use a specific physical network interface (e.g. wireless interface 1) may be based on various parameters like application requirements for network throughput, latency, availability of radio links, user context (location, time and connection cost), radio environment (signal quality, interference, etc.), and similar aspects. As mentioned above, the separation of the traffic on different physical network interfaces happens at the granularity of network flows or connections (e.g. TCP, UDP, and comparable ones) and supports the handover inside and between different network interface technologies (horizontal and vertical handover).

The virtual network flow engine 114 provides a way to transparently de-multiplex the outgoing traffic coming from the communication protocol layer 104 (e.g. TCP/IP stack) to multiple physical network interfaces 112-1 through 112-5 present on the device. Similarly all traffic arriving on the device from the physical network interfaces 112-1 through 112-5 goes through the virtual network flow engine 114 to the communication protocol layer 104. The virtual network flow engine 114 defines a virtual network interface 110 that is exposed to users and applications in the system. The physical network interfaces 112-1 through 112-5 may be hidden, as discussed previously. Virtual network interface 110 also contains components to hook various physical interfaces and to dispatch/compose data traffic to/from different physical network interfaces 112-1 through 112-5, based on policy rules configured by the virtual network interface manager 106. The virtual network interface 110 may implement different types of de-multiplexing such as spatial and time based. Spatial de-multiplexing refers to the usage of different physical network interfaces in parallel. Time division de-multiplexing refers to a mode where a single physical network interface is used to support multiple configurations corresponding to different links based on the division of time. In such a mode a network card may be used in each of the configured mode for a subset of the time.

According to one embodiment, the virtual network interface 110 may be implemented as a standardized network interface driver (e.g. a Network Driver Interface specification "NDIS" driver), which exposes a protocol driver to physical network interfaces 112-1 through 112-5 and a miniport interface to the communication protocol layer 104. In the NDIS terminology, this type of driver is called an intermediate driver as it sits in between a physical network driver and the protocol stack. This driver also exposes a file stream interface through which it can communicate with the virtual network interface manager 106 in order to receive commands, send back notifications, and perform similar actions.

The virtual network interface manager 106 is a user-mode component that controls the behavior of the virtual network flow engine 114. In its management role, the virtual network interface manager 106 may define policy rules for managing multiple network interfaces. These rules present criteria describing which physical network interface should be used under which conditions. There may be different criteria for different conditions, such as maximal throughput, minimal delay, optimized power consumption, lowest communication cost, and comparable factors. The virtual network interface manager 106 may also negotiate with a communication peer which physical network interface should be used for a new session as well as the configuration parameters of the physical network interface, such as wireless transmission technology, frequency, bandwidth, and similar parameters. The result of this negotiation may be sent to the virtual network flow engine 114 and used there for dispatching data traffic of this connection to the appropriate physical network interface.

A further role of the virtual network interface manager 106 may be the monitoring of the environment and triggering of actions as required. The virtual network interface manager 106 may keep track of network usage such as bytes transferred on different physical interfaces, wireless spectrum usage around the node, communication statistics data, and similar parameters. Based on the collected data, the virtual network interface manager 106 may decide which physical network interface should be used by the next new session, and if a physical network interface meets the session requirements. The virtual network interface manager 106 may trigger a handover procedure to transfer one or more sessions to another physical network interface in a transparent manner to users and applications.

The virtual network interface manager 106 may have an associated data storage unit such as a file, a database, or comparable storage mechanisms (e.g. in data store 108), which maintains information used to refine the decision process while selecting a physical network interface for a particular session. The information contained in the data storage unit may include basic configuration data like available physical network interfaces and their properties such as supported wireless communication technology, frequency range, and MAC address(es). The information may further include advanced historical data like usage data of each physical network interface, wireless spectrum usage, link quality, network usage, traffic pattern of applications, and comparable previously collected data. In addition, the virtual network interface manager 106 may share information in the database with managers on other devices.

While specific components and networks have been described above, these are for illustration purposes only and do not constitute a limitation on embodiments. Many other hardware environments, components, and network types may be used in implementing a network communication optimization and simplification system according to embodiments using the principles described herein. The above discussed tasks and operations may be distributed in a number of ways among the software and hardware components of the connected network devices. Network communications may also be established through wired, wireless, optical, and other types of communication media.

Figure 2:
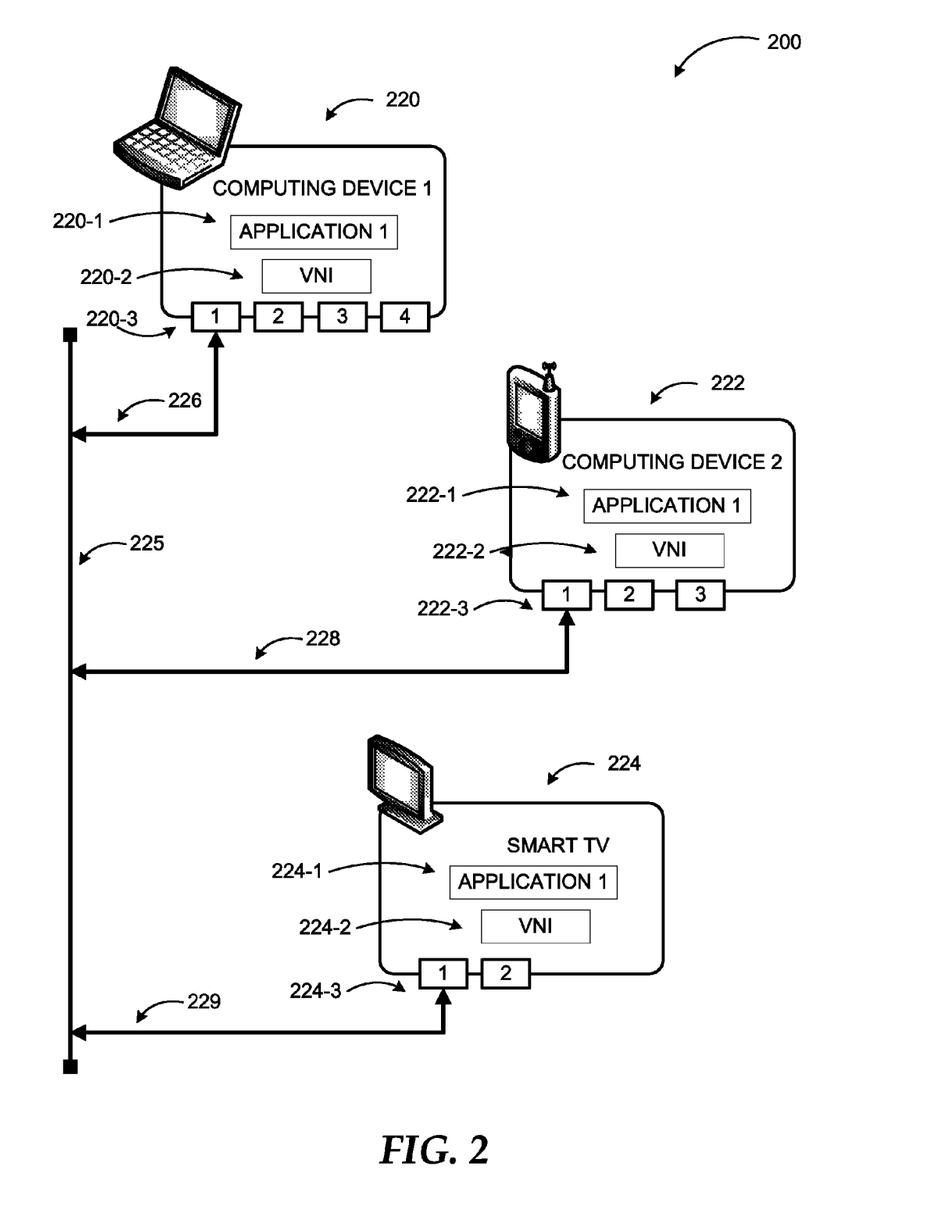
FIG. 2 is a conceptual diagram illustrating example devices with multiple physical network interfaces communicating over a network.

FIG. 2 is a conceptual diagram illustrating example devices with multiple physical network interfaces communicating over a network. Diagram 200 shows three example computing devices communicating over a close proximity network such as a home network. As discussed previously, a home network with wired and/or wireless components is an illustrative example of network environments for implementing embodiments, but other types of networks, where point-to-point communication between connected devices other than the default network infrastructure is possible, may also be used.

Example computing device 220 is a laptop computer with four physical network interfaces 220-3 (e.g. a wired Ethernet interface, a wireless 802.11b interface, a wireless 802.11a interface, a wireless Bluetooth® interface, or an optical infrared interface). An example application 220-1 executed on computing device 220 communicates with other devices through one of those physical network interfaces. In a conventional system, a default physical network interface would be assigned for communications based on a default infrastructure network (e.g. 802.11 interface) and used unless the user manually reconfigures the network interface requiring complex operations and breaking of current communication with another device. According to one embodiment, computing device 220 also includes virtual network interface 220-2 managed by a virtual network interface manager (not shown).

Example computing device 222 may be a portable computer such as a handheld device. Example computing device 222 includes three physical network interfaces 222-3 and executes application 222-1, which is communicating over one of the network interfaces. A virtual network interface 222-2 in computing device 222 is exposed to application 222-1 as the sole network interface and directs data traffic through one or more of the physical network interfaces 222-3. In the example shown in diagram 200, computing device 220 and computing device 222 communicate via links 226 and 228 (which may also be considered as a single link) through physical network interfaces 1 on each device utilizing the default infrastructure network 225. In an example scenario, computing device 222 may be a Personal Digital Assistant (PDA) with 802.11a, Bluetooth®, and infrared network interfaces and use the 802.11a interface to communicate with computing device 220 due to distance, amount of data to be exchanged, etc. The 802.11a interface is the default infrastructure network's primary communication protocol and may be used by the virtual network interface managers as the control channel necessary for negotiation. Virtual network interface managers for computing devices 220 and 222 may negotiate after establishing communication over the control channel to use another physical network interface or a different set of communication parameters (e.g. a different wireless communication frequency) and move to the new channel (new set of parameters).

Computing device 224 may be a smart television capable of receiving video and other data from other devices in addition to a conventional TV broadcast source and display the received data. Smart TV 224 may execute a video application 224-1, which communicates with a video data source, manages display of the received data, and performs other related tasks. Smart TV 224 may include two physical network interfaces 224-3 managed by its virtual network interface manager through virtual network interface 224-2. In the shown example computing device 220 and smart TV 224 communicate via links 226 and 229 over infrastructure network 225 through their first physical network interface as discussed above for computing devices 220 and 222. As above, computing device 220 and smart TV 224 may select another physical network interface due to throughput requirements (large amounts of video stream data), wireless signal quality, and similar parameters in a transparent manner to the communicating applications/users for each device.

Figure 3:
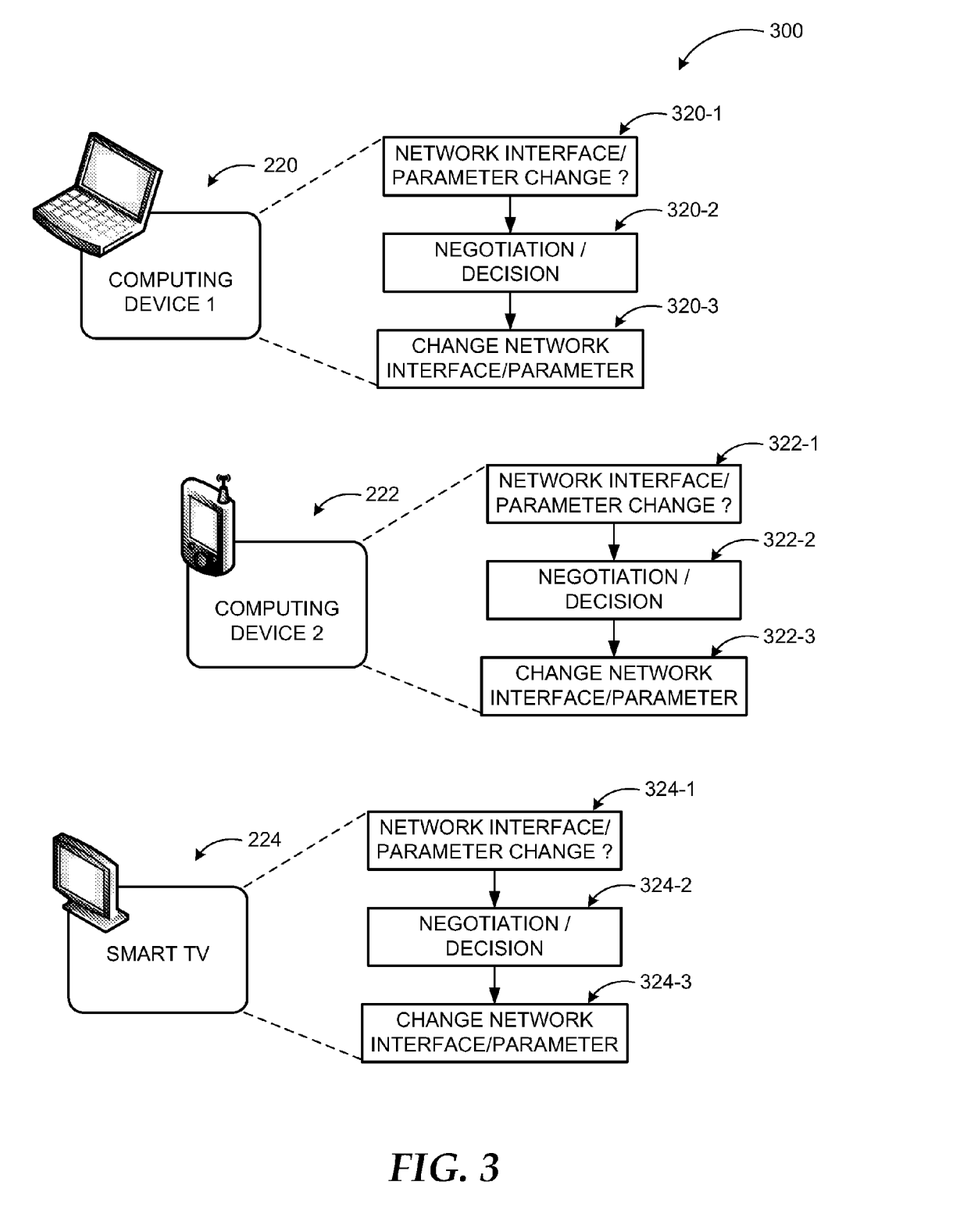
FIG. 3 illustrates network interface change in the example devices of FIG. 2 according to embodiments.

FIG. 3 illustrates network interface change in the example devices of FIG. 2 according to embodiments in diagram 300. As mentioned previously, one of the important advantages of a system according to embodiments is that it enables dynamic modification of network communications based on detected and/or predefined parameters. For example, the communication between computing device 220 and smart TV 224 may initially include uploading of a video stream requiring relatively large bandwidth and good signal quality. Later on, the uploading of the video stream may be completed and computing device 220 may transmit configuration information (e.g. channel selection, display parameters) to smart TV 224, which does not require the same bandwidth as the video stream. Thus, upon detecting the changing nature of data traffic, the virtual network interface manager of the computing device 220 may negotiate a different physical network interface with the virtual network interface manager of smart TV 224 and switch to the new physical network interface (or change parameters of the communication such as bandwidth, frequency, transmission power, etc. on the same physical network interface). In this example, the link is adapted based on the changing application requirements. The link may also be adapted if the conditions of operations on the existing link are suddenly degraded by interferences or other devices sharing the same frequency band. Thus, if a discrepancy between the requirement of applications and the current link is detected, the system attempts to change the parameters of the link or to switch to another link.

At a high level, the process may be described by three main steps: determination of whether or not a network interface/parameter change is needed (320-1, 322-1, 324-1); negotiation with the counterpart virtual network interface manager or receiving decision information from a controlling manager (320-2, 322-2, 324-2); and changing to the new physical network interface/network interface parameters. According to one embodiment, the process may be implemented in a completely distributed manner, where two counterpart virtual network interface managers negotiate and decide independent from other nodes in the network. According to another embodiment, a controlling virtual network interface manager may receive information from other managers and make the decision for some or all of the devices in the network. Further embodiments may be implements combing the first two alternatives depending on network type, available interfaces, computing device types and capabilities, and comparable parameters.

In more detail, when the virtual network manager begins its operations, it binds the intermediate driver of the virtual network interface to all physical interfaces at its lower layer. Thus it appears to all the physical interfaces as a protocol driver. The virtual network interface then binds to the communication protocol layer (e.g. TCP/IP stack) at its upper layer as a miniport adapter. The virtual network interface manager also hides the physical interfaces from the communication protocol layer by removing their bindings from the communication protocol layer. Thus, the communication protocol layer sees only one virtual network interface in the system.

The virtual network interface manager may mark one of the physical network interfaces as the primary network interface. The primary network interface may be the one which is connected to the default infrastructure of the network. A primary network interface may be necessary to enable standard protocols to be supported such as Simple Service Discover Protocol "SSDP", Web Service Discovery, or similar ones. If more than one physical network interface is connected to the same infrastructure network (e.g. a PC is connected to a router using both Ethernet and 802.11 wireless), then only one of the interfaces may be marked as the primary network interface. In such a case, the decision may be based on simple rules defined by system configuration, such as preferred network connection. For the primary physical network interface, the virtual network interface simply works as a pass through driver.

The virtual network flow engine manages active sessions and links in the system. A session defines a connection between two communication nodes. A link defines a transport for a set of sessions and represents a specific set of parameters on a specific network interface. The virtual network flow engine may maintain a link table and a session table. The link table is used to keep information regarding the configuration of the different physical network interfaces bound by the virtual network interface. Each entry in the link table may be identified by a link identifier in a unique way. A link may use the complete time of the underlying interface or use a portion of it (time division). The session table is used to keep information regarding all active sessions and their mapping to links. It should be noted that the parameters associated to a defined link (bandwidth, power, frequency, etc.) may be dynamically modified as a result of a modification of the operating conditions. According to some embodiments, a session may be socket-based TCP or UDP connection between two nodes. A session may be identified by a standard tuple (Protocol, Source IP, Source Port, Destination IP, Destination Port).

It should be noted that the IP addresses refer to the primary network interface. In the session table, each session may be associated with a link identifier and an identifier of the destination node (e.g. MAC address). The link identifier indicates which link on the local node is being used for the particular session. The destination node identifier is needed when the virtual network flow engine forwards packets from the virtual network interface to the physical network interface. The destination node identifier may be discovered during link negotiation. In addition, if no traffic is seen on the session for a defined amount of time, the session may be removed from the session table.

When an application starts a new network connection, the virtual network interface manager first needs to determine which link should be used for this connection. To achieve this, the virtual network interface manager may use the primary interface as a control channel, to communicate with the virtual network interface manager on the destination node, and to negotiate the link for this particular session based on the current snapshot of the databases on both nodes.

Figure 4:
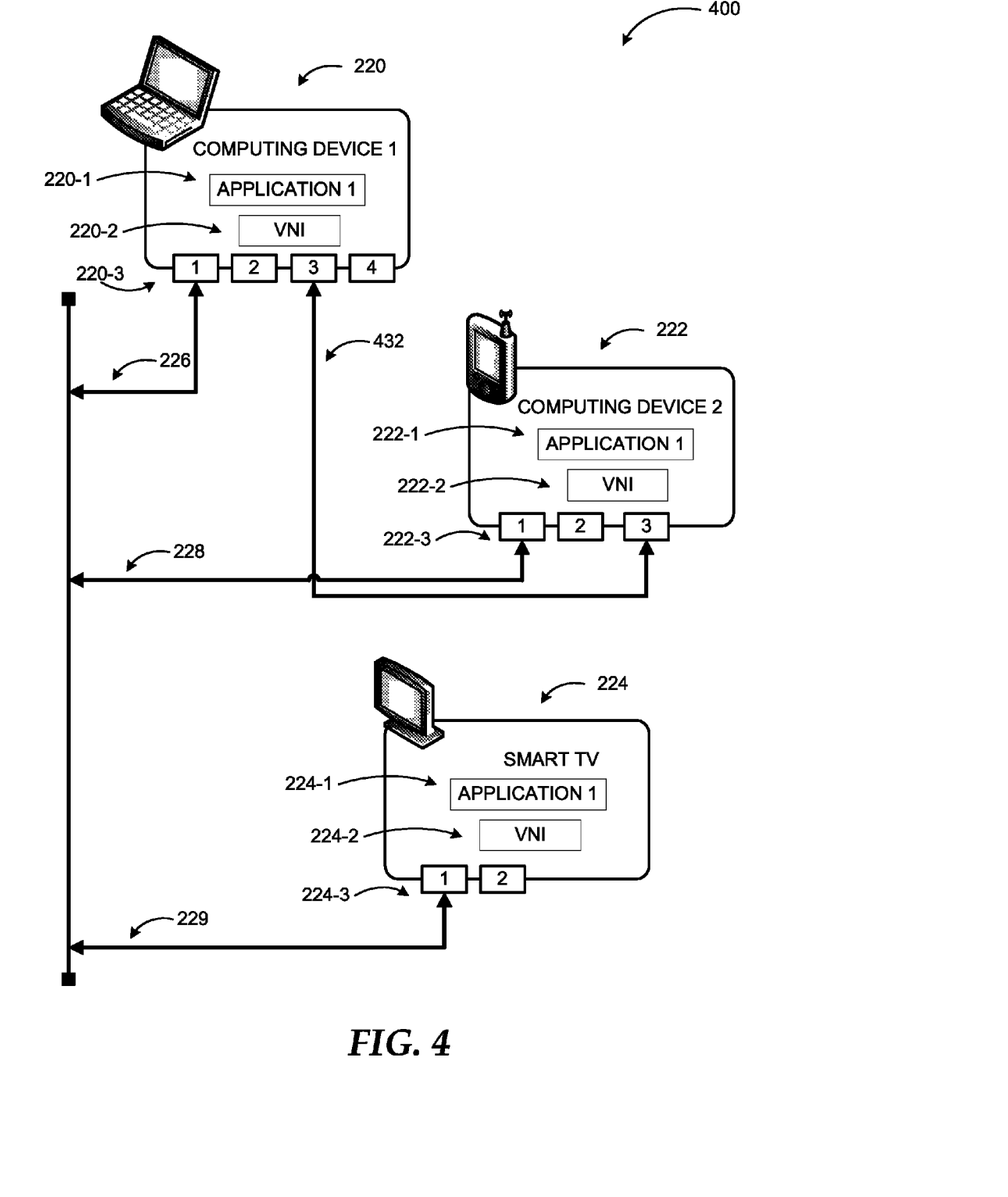
FIG. 4 is another conceptual diagram illustrating the example devices of FIG. 2 communicating through different physical network interfaces following a change process according to embodiments.

FIG. 4 includes another conceptual diagram 400 illustrating the example devices of FIG. 2 communicating through different physical network interfaces following a change process according to embodiments.

Following the process(es) described above, computing device 220 and computing device 222 may negotiate and decide to switch to a new direct link 432 using their third physical network interfaces (e.g. 802.11a) based on changing wireless environment conditions (e.g. interference in the previous link). As the figure shows, the new direct link 432 does not use the default infrastructure network, utilizing a point-to-point communication outside the default infrastructure network instead.

Computing device 220 and smart TV 224 continue using the original links 226, 229 over the infrastructure network 225, but may change a parameters of communication (e.g. frequency) based on changing application requirements or communication environment conditions. It should be noted, that in a system according to embodiments, two sets of applications/devices may share the same link by employing time multiplexing and do not have to vacate a link in order for another set to communicate over the same link.

As mentioned previously, embodiments are directed mainly to optimization and simplification of network communications between nodes of a network through the use of point-to-point links based on device capabilities, communication environment related conditions, data throughput needs, and comparable parameters. Embodiments are, however, not limited to networks that only provide point-to-point communications. The proposed framework may be implemented in any network that includes at least some devices capable of point-to-point communications. For example, all of the computing devices in a network may be managed through a default infrastructure by a server. In addition to this default management, some devices may employ the framework according to embodiments in order to optimize their communication while still participating in the network.

The computing devices where embodiments may be implemented include any network capable computer, as well as other electronic devices capable of communicating over a network. Examples of such device include, but are not limited to, entertainment systems, monitoring systems, alarm systems, vehicle-mount computing devices, portable computing devices (smart phones, PDAs, smart remote control devices), and others.

Figure 5:
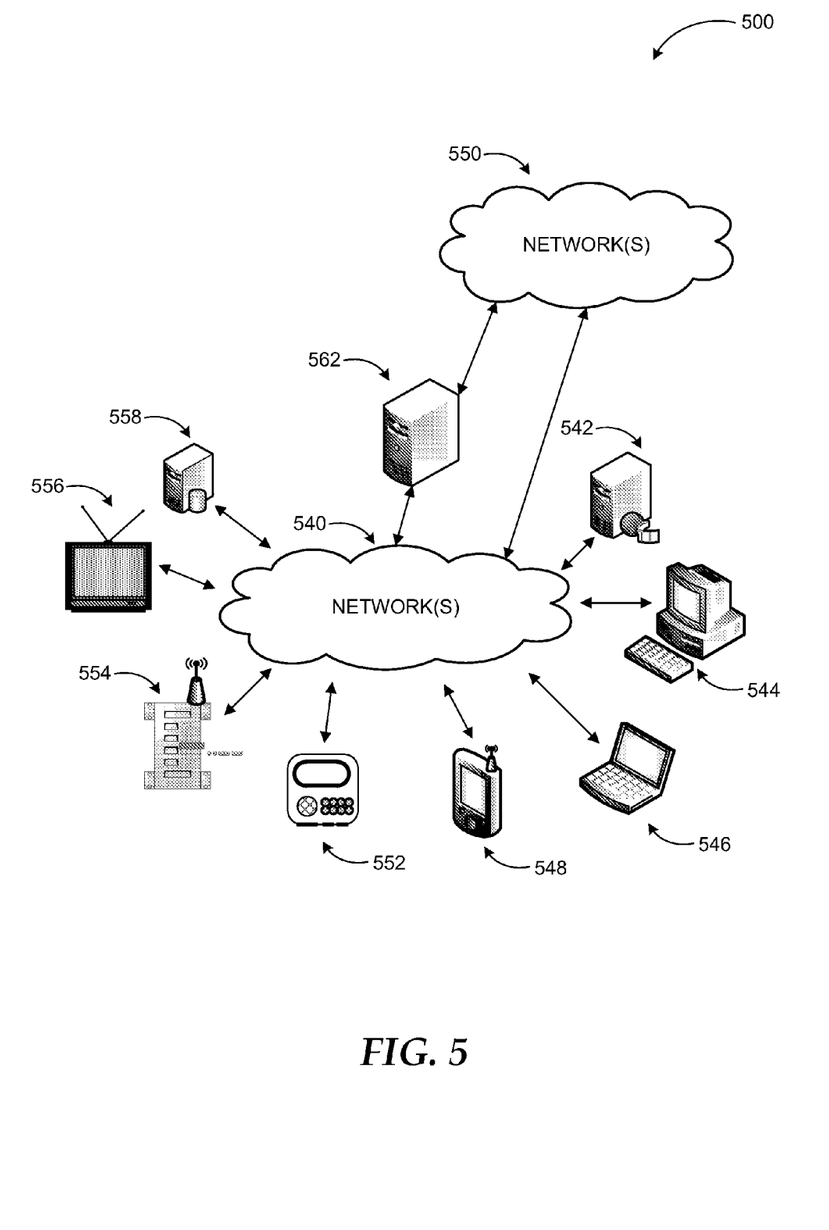
FIG. 5 is an example networked environment, where embodiments may be implemented.

FIG. 5 is an example networked environment, where embodiments may be implemented. A wide variety of computing devices such as media server 542, desktop computer 544, laptop computer 546, handheld computer 548, alarm monitoring device 552, media entertainment center 554, smart TV 556, and data storage server 558 may communicate over one or more network(s) 540.

Network(s) 540 may facilitate communication between the devices and applications implemented in un-clustered systems or clustered systems, and may have a static or dynamic topology. Network(s) 540 may include a secure network or an unsecure network such as a wireless open network. In addition to providing communication between the nodes described herein network(s) 540 may provide connection to other networks 550 such as the Internet directly or through intermediary devices such as server 562. By way of example, and not limitation, network(s) 540 may include wired media and wireless media such as acoustic, RF, infrared and other wireless media.

Network(s) 540 may include one or more of the different networks described above allowing connected computing devices to communicate over different media. A framework according to embodiments may be implemented in a distributed manner in the nodes associated with the network(s) 540 and enable optimization and simplification of network communication by automatically and dynamically selecting physical network interfaces for communication between computing devices as well as the network type based on predefined and detected parameters. Using a virtual network interface exposed to the applications on the computing devices in place of the actual physical network interfaces and a virtual network interface manager, time division multiplexing and spatial multiplexing (use of multiple interfaces for the same application) may be accomplished. Time division multiplexing allows use of same physical network interface to communicate with two or more other communicating devices simultaneously in a time-division manner, but with different link parameters (e.g. frequency and bandwidth).

Many other configurations of computing devices, applications, data sources, and network types may be employed to implement a framework for optimizing and simplifying network communications in close proximity networks. Furthermore, the networked environments discussed in FIG. 5 are for illustration purposes only. Embodiments are not limited to the example applications, modules, or processes.

Figure 6:
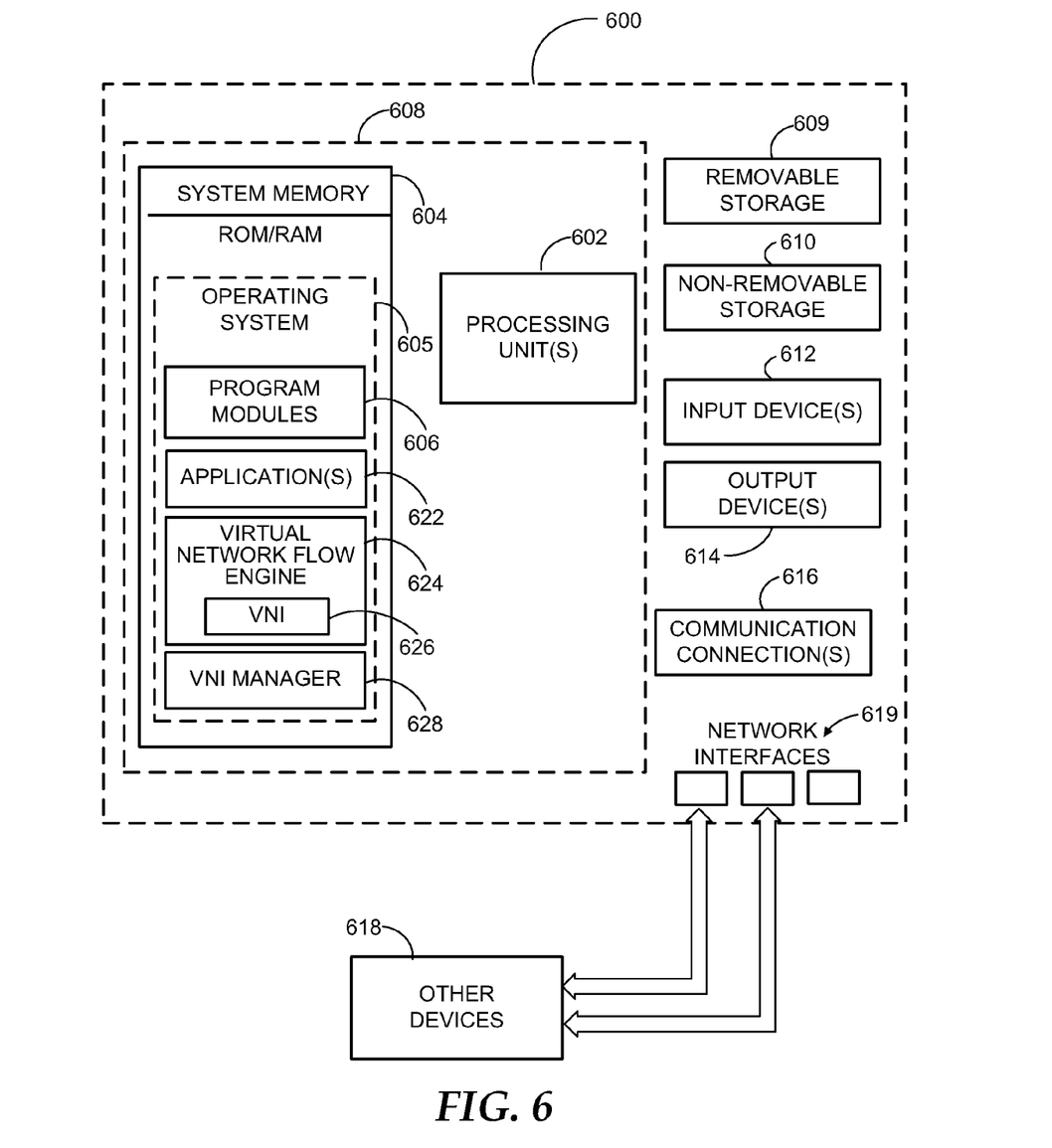
FIG. 6 is a block diagram of an example computing operating environment, where a framework according to embodiments may be implemented.

FIG. 6 and the associated discussion are intended to provide a brief, general description of a suitable computing environment in which embodiments may be implemented. With reference to FIG. 6, a block diagram of an example computing operating environment for a platform according to embodiments is illustrated, such as computing device 600. In a basic configuration, computing device 600 may include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, applications 622, virtual network flow engine 624, virtual network interface 626, and virtual network interface manager 628.

Applications 622 may be any software application that communicates with other applications over a network as part of their operation. In an operation according to embodiments, virtual network flow engine 624 first uses a primary network interface as the default link for a connection. Virtual network flow engine 624 creates a new entry in a session table which uses the primary network interface as the link, and passes the packet to the primary physical network interface. At the same time, the virtual network flow engine 624 informs the virtual network interface manager 628 of computing device 600 that a new session has been detected. The local virtual network interface manager 628 sends then a link negotiation request to the virtual network interface manager at the counterpart computing device. After exchanging information stored in their respective data stores, both managers agree on a physical network interface 619 and associated parameters for this new session. If the link is a new one, it is added into the link table on both computing devices, and the designated physical network adapter is configured. Then, the virtual network interface manager 628 informs the virtual network flow engine 624 of the negotiation result. As a consequence, the virtual network flow engine 624 updates the session table to use the newly negotiated link, instead of the primary network interface. All the session traffic is now redirected to the chosen physical interface. If a link for an existing communication session is lost during a session, the existing communication session utilizing another physical network interface may be re-established through the default physical network interface in a transparent manner to the application.

A communication protocol layer (not shown) such as a TCP/IP stack may also be executed as part of the operating system 605 or as a distinct module to facilitate communications with other applications/devices for application(s) 622. When the virtual network interface 626 receives a network packet from the communication protocol layer, it first looks up in the session table by using session identifier (e.g. source IP, source port, destination IP, destination Port) to check whether the packet is for an already established session or for a new session. If a new session is detected, virtual network interface manager 628 launches the link negotiation process as described above. If the packet is associated with a session which has an entry in the session table, the virtual network interface 626 uses that entry to route the packet to the destination by passing the packet to the appropriate physical network interface 619 via the corresponding packet queue at communication connections 616. If needed, the virtual network interface 626 might also have to change the destination and source MAC address in the packet header to reflect the fact that a different physical interface is now used to transfer the data.

The basic configuration of computing device 600 according to embodiments is illustrated in FIG. 6 by those components within dashed line 608. Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, an infrared link, and comparable mechanisms. Other devices 618 may include computing devices that execute applications communicating with applications 622 of computing device 600. Communication connection(s) 616 may also manage one or more physical network interfaces 619, provide communication protocol layer services, and similar services. In a device according to embodiments, virtual network flow engine 624 may take over management of physical network interfaces 619 as described previously. Communication connection(s) 616 utilizes communication media for facilitating communication with other devices 618. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
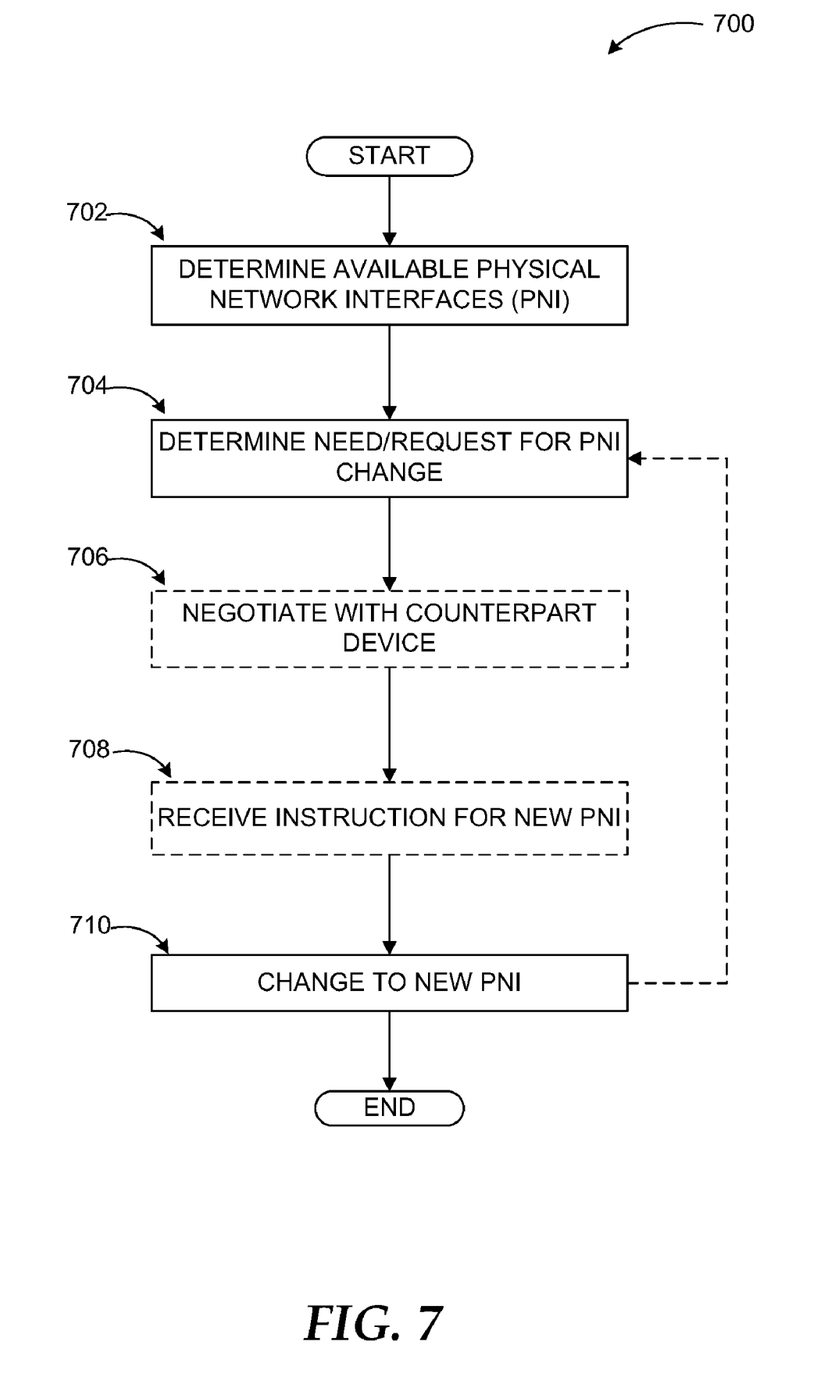
FIG. 7 illustrates a logic flow diagram for optimizing network communications in a close proximity network according to embodiments.

FIG. 7 illustrates a logic flow diagram of process 700 for optimizing network communications in a close proximity network according to embodiments. Process 700 may be implemented as part of a framework utilizing the components discussed above executed in computing devices communicating over a close proximity network.

Process 700 begins with operation 702, where available physical network interfaces are determined. An initial physical network interface selection process for communication may be based on a set of default rules or based on dynamic determination of environmental parameters such as data throughput need, security need, signal quality, and similar conditions. Moreover, time multiplexing may be employed to accommodate multiple applications' communication through the same physical network interface using different link configurations at different times to applications running on two or more other devices simultaneously. Processing advances from operation 702 to operation 704.

At operation 704, a need for changing a physical network interface for a particular application (switch to a different link) is determined. Such a determination may be made based on monitoring environmental conditions similar to those discussed above or based on predefined rules such as time of day, location of computing device, and similar rules. Alternatively, a request for switching the communication link may be received from the communicating application or a counterpart device. Processing moves from operation 704 to optional operation 706.

At optional operation 706, the virtual network interface manager negotiates with its counterpart the needed/requested switch to a new link. The new link may be communication through a different medium (and associated physical network interface) or through a different communication mode using the same medium (e.g. different bandwidth, frequency, modulation, and similar modes).

At optional operation 708, which is alternative to optional operation 706, instructions for the new link may be received from a controlling virtual network interface manager. As discussed previously, a system according to embodiments may be implemented in a completely distributed manner or in a controlled manner, where one or more virtual network interface managers determine link switches for some of the connected devices.

From optional operations 706 and 708, processing advances to operation 710, where communication is changed to the new link in a transparent manner to the communicating application(s). From the perspective of the application(s), communication is seamlessly continued through the virtual network interface allowing optimization of the network communication without having manual intervention by the user. This also simplifies computing device operations for the user, since they do not need to have the knowledge necessary to configure different physical network interfaces based on changing conditions. After operation 710, the process typically returns to operation 704 for another iteration of the network interface change if a change in communication environment or other conditions is detected.

The operations included in process 700 are for illustration purposes. Optimizing and simplifying network communications in close proximity networks may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for optimizing network communication, the method comprising:
   determining available physical network interfaces on the computing device;
   determining a value of at least one predefined communication parameter; and
   employing a virtual network interface between a communication protocol layer and the available physical network interfaces such that an application executed on the computing device is enabled to communicate over a network through the virtual network interface independent of a physical network interface actually used for the network communication by:
      dynamically switching the actually used physical network interface to a new physical network interface for a particular communication session between the application and a counterpart node on the network in a transparent manner to the application based on the determined value of the at least one predefined communication parameter, wherein the new physical network interface is selected based on a negotiation between a virtual network interface manager on the computing device and another virtual network interface manager on the counterpart node.

2. The method of claim 1, further comprising:
   enabling the application to communicate with a plurality of nodes on the network through a plurality of communication sessions utilizing a plurality of physical network interfaces managed by the virtual network interface, wherein the physical network interfaces are transparent to the application.

3. The method of claim 2, further comprising:
   enhancing a network throughput by enabling the plurality of physical network interfaces to be utilized simultaneously for the application in a transparent manner to the application.

4. The method of claim 1, further comprising:
   enabling a plurality of applications executed on the computing device to communicate with a plurality of nodes on the network through a plurality of communication sessions utilizing the physical network interfaces managed by the virtual network interface, wherein the physical network interfaces are transparent to the application.

5. The method of claim 1, further comprising:
   enabling use of a single physical network interface by a plurality of link configurations simultaneously through time division multiplexing in a transparent manner to the plurality of applications.

6. The method of claim 1, wherein the new physical network interface is selected based on instructions received from a controlling virtual network interface manager on another node of the network.

7. The method of claim 1, wherein the new physical network interface is selected partially based on a negotiation between a virtual network interface manager on the computing device and another virtual network interface manager on the counterpart node, and partially based on instructions received from a controlling virtual network interface manager on another node of the network.

8. The method of claim 1, wherein the at least one communication parameter includes at least one from the following set: a required communication bandwidth, available network links, a quality of available network links, current usage of available network links, a characteristic of the communication protocol layer, a location of the computing device, a time of day, and a cost of connection.

9. The method of claim 1, further comprising:
   designating one of the available physical network interfaces as a default network interface such that all computing devices on the network are discoverable through the default network interface using a standard communication protocol.

10. A system for optimizing network communication, the system comprising:
   a computing device coupled to a network and a network interface management framework, the computing device configured to execute the local components of the network interface management framework and at least one application, wherein the local components of the network interface management framework include:
      a virtual network flow engine configured to direct data traffic between the at least one application and available physical network interfaces by exposing a virtual network interface to the at least one application in place of the available physical network interfaces; and
      a virtual network interface manager configured to:
         define policy rules for managing the physical network interfaces;
         negotiate with a counterpart virtual network interface manager to select and configure a physical network interface for a new communication session between the at least one application and another application on a computing device hosting the counterpart virtual network interface manager; and monitor parameters and communication environment to determine whether a criterion for switching to a different physical network interface is met based on the policy rules, and trigger a negotiation process for switching to the different physical network interface if the criterion is met.

11. The system of claim 10, wherein the virtual network flow engine is further configured to maintain a link table for storing information associated with configuration of physical network interfaces bound by the virtual network interface and a session table for storing associations between active sessions and links.

12. The system of claim 11, wherein the virtual network flow engine is further configured to:

enable a plurality of applications executed on the computing device to communicate through a single physical network interface by employing time division multiplexing of the single physical network interface for links associated with the plurality of applications in a transparent manner to the plurality of applications; and enable the at least one application to communicate through a plurality of physical network interfaces by employing a plurality of links for the at least one application in a transparent manner to the at least one application.

13. The system of claim 10, wherein the virtual network interface manager is further configured to receive instructions from a controlling virtual network interface manager on another node of the network for selecting and configuring the physical network interface for the new communication session.

14. The system of claim 10, wherein the computing device is one from the following set: a desktop computer, a laptop computer, a handheld computer, a smart entertainment system, a smart television, an alarm system, a smart remote control device, a monitoring system, and a server; and wherein the network includes at least one from the following set: a radio frequency wireless network, a wired network, and optical wireless network.

15. A computer-readable storage memory having instructions stored thereon for causing a computing device to perform actions to optimize network communications, the actions comprising:

determining available physical network interfaces on the computing device; and employing a virtual network interface between a communication protocol layer and the available physical network interfaces such that:

the application is enabled to communicate with a plurality of nodes on the network through a plurality of communication sessions utilizing a plurality of physical network interfaces managed by a virtual network flow engine in a transparent manner to the application;

the application is enabled to communicate with a counterpart application on another node of the network through the plurality of physical network interfaces simultaneously in a transparent manner to the application; and a plurality of applications executed on the computing device are enabled to use a single physical network interface simultaneously through time division multiplexing in a transparent manner to the plurality of applications; and dynamically changing a communication link configuration for a communication session between the application and a counterpart node on the network in a transparent manner to the application based on predefined policy rules, wherein the communication link configuration includes one from the following: a physical network interface used by the communication link and a communication parameters of the physical network interface used by the communication link.

16. The computer-readable storage memory of claim 15, wherein the predefined policy rules include criteria for switching the physical network interface based on at least one from the following set: a communication throughput, a delay requirement, a latency requirement, a user location, a time of day, a cost of communication, and a communication environment quality.

17. The computer-readable storage memory of claim 15, wherein the actions further comprise:

establishing an initial communication session utilizing a default physical network interface through which all computing devices on the network are discoverable; and re-establishing an existing communication session utilizing one of the following: another physical network interface and a different communication parameter for the default physical network interface, if a link for the existing communication session is lost during the session in a transparent manner to the application.

18. The computer-readable storage memory of claim 15, wherein the dynamic switching to the new physical network interface is accomplished through at least one of: a negotiation between virtual network interface managers of the computing device and the counterpart node and a set of instructions received from a central virtual network interface manager controlling network interface management of computing devices coupled to the network.

* * * * *